United States Patent
Buchanan et al.

(10) Patent No.: US 6,320,609 B1
(45) Date of Patent: Nov. 20, 2001

(54) SYSTEM USING A POLAR COORDINATE STAGE AND CONTINUOUS IMAGE ROTATION TO COMPENSATE FOR STAGE ROTATION

(75) Inventors: Robert Buchanan, Pleasanton; Richard A. Yarussi, Mountain View; Blaine R. Spady, San Jose, all of CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 09/113,484

(22) Filed: Jul. 10, 1998

(51) Int. Cl.$^7$ ................................................. H04N 7/18
(52) U.S. Cl. ......................................... 348/126; 348/135
(58) Field of Search ........................ 250/360.1, 372, 250/492.22, 559.08, 559.18, 559.41, 559.46; 341/13; 348/125–131, 135, 142; 359/391, 393; 716/21; H04N 7/18

(56) References Cited

U.S. PATENT DOCUMENTS

| | | | |
|---|---|---|---|
| H1530 | 5/1996 | Lee ........................................ | 395/124 |
| 3,147,474 | 9/1964 | Kliman ................................. | 340/347 |
| 4,002,827 | 1/1977 | Nevin et al. ........................ | 343/5 SC |
| 4,106,021 | 8/1978 | Katagi ................................. | 343/5 SC |
| 4,149,252 | 4/1979 | Miller, Jr. ............................. | 364/456 |
| 4,190,895 | 2/1980 | Davis ................................... | 364/815 |
| 4,250,559 | 2/1981 | Blaschke ............................. | 364/815 |
| 4,306,296 | 12/1981 | Blaschke ............................. | 364/815 |
| 4,449,818 * | 5/1984 | Yamaguchi et al. ................ | 348/126 |
| 4,457,664 | 7/1984 | Judell et al. .......................... | 414/779 |
| 4,737,905 | 4/1988 | Yoshida et al. ...................... | 364/190 |
| 4,907,880 | 3/1990 | Egan .................................... | 356/151 |
| 5,308,222 | 5/1994 | Bacchi et al. ....................... | 414/783 |
| 5,331,458 * | 7/1994 | Bacchi et al. ....................... | 359/391 |
| 5,444,245 | 8/1995 | Kitamura ............................. | 250/307 |
| 5,446,584 * | 8/1995 | Bacchi et al. ....................... | 359/393 |
| 5,511,934 | 4/1996 | Bacchi et al. ....................... | 414/783 |
| 5,513,948 | 5/1996 | Bacchi et al. ....................... | 414/783 |
| 5,625,193 * | 4/1997 | Broude et al. .................... | 250/360.1 |
| 5,646,776 | 7/1997 | Bacchi et al. ....................... | 359/393 |
| 5,699,266 * | 12/1997 | Chung et al. ................... | 250/492.22 |
| 5,814,829 * | 9/1998 | Broude et al. ................... | 250/559.46 |
| 5,852,413 * | 12/1998 | Bacchi et al. ....................... | 341/13 |
| 6,108,091 | 8/2000 | Pecen et al. ........................ | 356/381 |

FOREIGN PATENT DOCUMENTS 1 055 903 A1    11/2000   (EP) .

* cited by examiner

*Primary Examiner*—Richard Lee
(74) *Attorney, Agent, or Firm*—Skjerven Morrill MacPherson LLP; Brian D. Ogonowsky; Michael J. Halbert

(57) ABSTRACT

A method for controlling a polar coordinate stage moves an object relative to an imaging system. While moving the object, the image of the object is rotated to compensate for rotation of the object. Accordingly, the orientations of features in the image are preserved, and removal of apparent rotation in the image reduces confusion an operator experiences while directing movement of the object. The angular velocity of the motion of the object is controlled so that image shift speed is independent of the radial position of the point being viewed. Use of a polar stage, reduces the required foot print for a stage and facilitates prealignment. In particular, an edge detector measures the position of the edge of the object while the polar coordinate stage rotates the object. A prealignment process determines the position and orientation of the object from the measured edge positions. A further alignment process uses automated pattern recognition which more easily identifies features on the object when the image is rotated so that the orientations of the feature are approximately known.

35 Claims, 6 Drawing Sheets

SYSTEM USING A POLAR COORDINATE STAGE AND CONTINUOUS IMAGE ROTATION TO COMPENSATE FOR STAGE ROTATION

BACKGROUND

1. Field of the Invention

This invention relates to measurement and inspection systems that use polar coordinate stages to position samples.

2. Description of Related Art

Many measurement and inspection systems mount samples such as semiconductor wafers on X,Y stages. An X,Y stage can move a sample in two independent orthogonal directions X and Y to select an area of the sample for viewing, imaging, or measurement. For example, an X,Y stage can move a wafer to select and position an area of the wafer in the field of view of an imaging system. The travel distances of the X,Y stage in the X and Y directions determine the size of the largest sample that can be inspected from edge to edge, and large samples require large travel distances. Accordingly, inspection systems have become larger to accommodate larger samples, for example, larger diameter semiconductor wafers.

The space required to accommodate the range of motion of an X,Y stage has a width that is equal to or greater than the width of the sample plus the travel distance in the X direction and a length that is equal to or greater than the length of the sample plus the travel distance in the Y direction. FIG. 1 illustrates a system 100 that uses an X,Y stage to position a circular sample 110. System 100 includes an imaging and/or measurement system (not shown) that can be, for example, a video camera, a microscope, an interferometer, a reflectometer, an ellipsometer, an FTIR spectrometer, or any type of spectrophotometer. Such systems typically have a field of view 130 that is much smaller than sample 110. To view the left edge of sample 110, the X,Y stage moves sample 110 to a position 112 where the left edge of sample 110 is in field of view 130. Position 112 is offset to the right from the central position of sample 110 by the radius r of sample 110. A position 116 for viewing the right edge of sample 110 is offset a distance r to the left along the X axis from the central position. Accordingly, the X,Y stage must have a travel distance of 2r along the X axis for edge-to-edge inspection of sample 110. Similarly, the X,Y stage must have a travel distance of 2r along the Y axis between positions 114 and 118, and a minimum area 120 required for an X,Y stage capable of positioning sample 110 for edge-to-edge viewing is about $16*r^2$.

Many applications require the sample to be accurately positioned and oriented or at least require accurate information regarding the position and orientation of the sample relative to the X,Y stage. This requirement is common in automated semiconductor manufacturing where the samples are generally round semiconductor wafers. A wafer's position can be accurately determined by rotating the wafer about a rotation axis and monitoring the variation in the perimeter location of the wafer as a function of the rotation. An analysis of the measured perimeter variations can accurately determine the offset from the rotation axis to the center of the wafer. Additionally, the process can identify the orientation of the wafer because most semiconductor wafers have an orientation indicator such as a notch or a flat on its perimeter. An edge detector detects when the flat or notch in the wafer's perimeter rotates past. Examples of such position detector systems, which are often referred to as prealigners, are described in U.S. Pat. No. 4,457,664 of Judell et al., U.S. Pat. No. 5,308,222 of Bacchi et al., U.S. Pat. No. 5,511,934 of Bacchi et al., and U.S. Pat. No. 5,513,948 of Bacchi et al. Prealignment for an X,Y stage requires addition of structure such as a separate prealignment station, from which the wafer is transferred to the X,Y stage after prealignment, or a rotatable sub-stage on the X,Y stage for rotating the wafer.

FIG. 2 illustrates a system 200 using a polar coordinate stage 220 to position sample 110. Polar coordinate stage 220 has a rotatable platform mounted on a linear drive mechanism. The linear drive mechanism moves the platform and a sample along a coordinate axis R, and the platform rotates the sample about the rotation axis of the platform. Polar coordinate stage 220 requires significantly less area when positioning sample 110 for edge-to-edge inspection. In particular, a travel distance r (the radius of the sample) along axis R out to a position 212 is sufficient to center in field of view 130 any radial coordinate ρ in the range from 0 to r. Rotation of sample 110 then selects an angular coordinate θ so that any point on sample 110 can be positioned in field of view 130. Since polar coordinate stage 220 only requires one-dimensional linear motion and half the travel distance of an X,Y stage, the polar coordinate stage takes much less area than an X,Y stage requires. In particular, a polar coordinate stage needs an area of about $6*r^2$, which is less than 40% of the area that an X,Y stage requires.

A disadvantage of a polar stage is the portion of sample 100 in field of view 130 generally appears to rotate when the stage rotates sample 100 to move from one inspection location to another. Thus, different areas appear to have different orientations when an operator or machine vision software views the sample through an imaging system. Additionally, the speed of movement generally varies from one location to another for any constant stage rotation speed. In some measurement systems, an operator observes an image of a portion of the sample being measured or inspected and controls movement of the sample to select which areas are measured or inspected. With a polar stage, image rotation and variable image motion can easily confuse or disorient the operator when the operator is continuously viewing or inspecting sample 110 and moving the sample from one position to another. Accordingly, systems and methods are sought that provide the area savings of a polar coordinate stage but avoid the confusion of image rotation and variable speeds of motion.

SUMMARY

In accordance with an aspect of the invention, a system including a polar coordinate stage and an imaging system rotates an image to continuously compensate for image rotation that results when the polar coordinate stage moves from one part of a sample to another. In one embodiment, a control system accepts from a control such as a joystick, a mouse, or an external computer, control commands which define the desired direction and speed of an image shift. The control system determines the required motion of the polar coordinate stage and the required image correction to achieve the desired image shift. The control system generates the signal required to conform to the control commands and applies the required signals to the ρ and θ drives in the polar coordinate stage. Image correction is performed by mechanically varying the imaging system or by processing image signals to rotate the image being viewed.

In one embodiment of the invention, the imaging system includes active opto-mechanical image correction. For example, when the imaging system includes an optical microscope, an optical element such as a dove prism rotates an image by an amount that depends on the variable property of the optical element. When the imaging system includes a scanning beam microscope, such as a scanning electron beam microscope, the active image rotation unit rotates the scan direction to rotate the image. The control system calculates and applies the required signals to adjust the active image correction device and achieve the necessary image correction. For example, the control system can rotate a dove prism or a beam deflector at the appropriate rate and direction to maintain the image orientation while the stage moves. Alternatively, the imaging system provides a first image signal representing an image that rotates as the stage rotates the sample, and the control system electronically processes the first image signal to generate a second image signal that maintains the desired orientation while the stage rotates.

In accordance with another embodiment of the invention, a measurement system includes a sample measurement subsystem, an imaging system, a polar coordinate stage, and a sample prealigner. The prealigner includes an edge detector that during a prealignment process measures the location of the edge of a sample while the polar coordinate stage rotates the sample. Accordingly, prealignment can be completed without additional structure for rotating the sample. After prealignment, an alignment (or deskewing) process uses pattern recognition to precisely locate features on the sample and from the locations of the features, provides a precise indication of the location of the sample. During alignment, the polar coordinate stage moves the sample so that a feature is in the field of view of the imaging system. When moving the feature into the field of view, the image of the sample is rotated, so that the feature has a known orientation. Since the orientation of the feature is approximately known, pattern recognition software can more easily and more quickly identify the location of the feature within the field of view. Thus, the alignment process is relatively fast. Once the sample is aligned, the stage moves the sample to points where the measurement subsystem measures the sample.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a system for measuring, viewing, or inspecting a sample uses a polar stage on which the sample is mounted. A control system which receives operator commands for linear movement of the sample, generates signals to the polar coordinate stage as required to achieve the linear movement, and rotates the image during motion to preserve a fixed orientation of the sample as viewed by the operator. Accordingly, an operator can easily and intuitively control the direction and velocity of the sample's motion.

In accordance with another aspect of the invention, an edge detector detects the location of the edge of a circular sample such as a semiconductor wafer while the polar stage rotates the sample. Processing of the edge measurements allows a precise determination of the position of center of the wafer and identification of an orientation indicator such as a flat or a notch on the edge of the wafer. Accordingly, the stage does not require additional degrees of freedom or additional structures for prealignment of the wafer.

Figure 1:
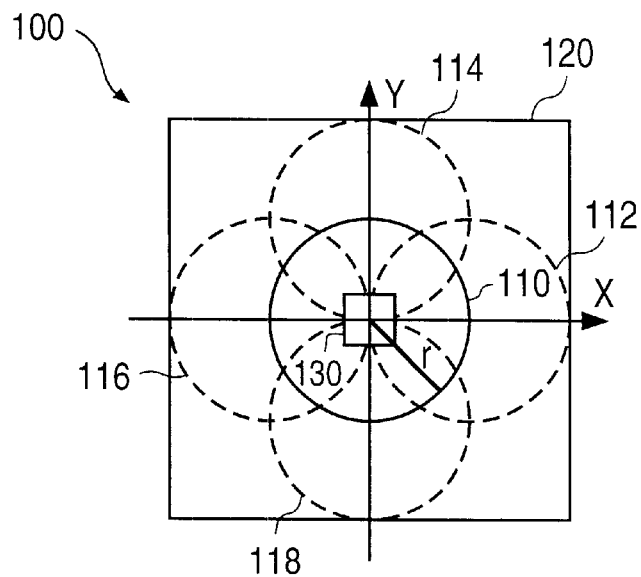
FIGS. 1 and 2 respectively illustrate the areas required for Cartesian and polar coordinate stages that have the same coverage capability.
Figure 2:
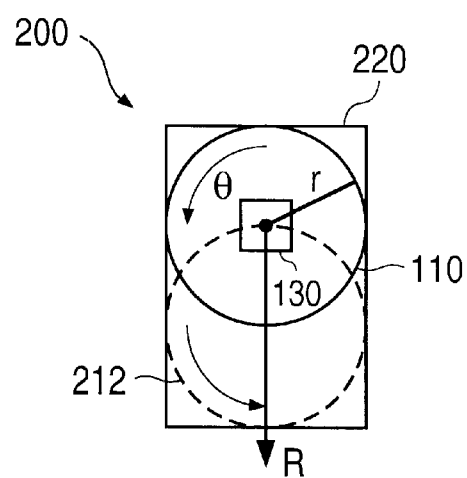
Figure 3:
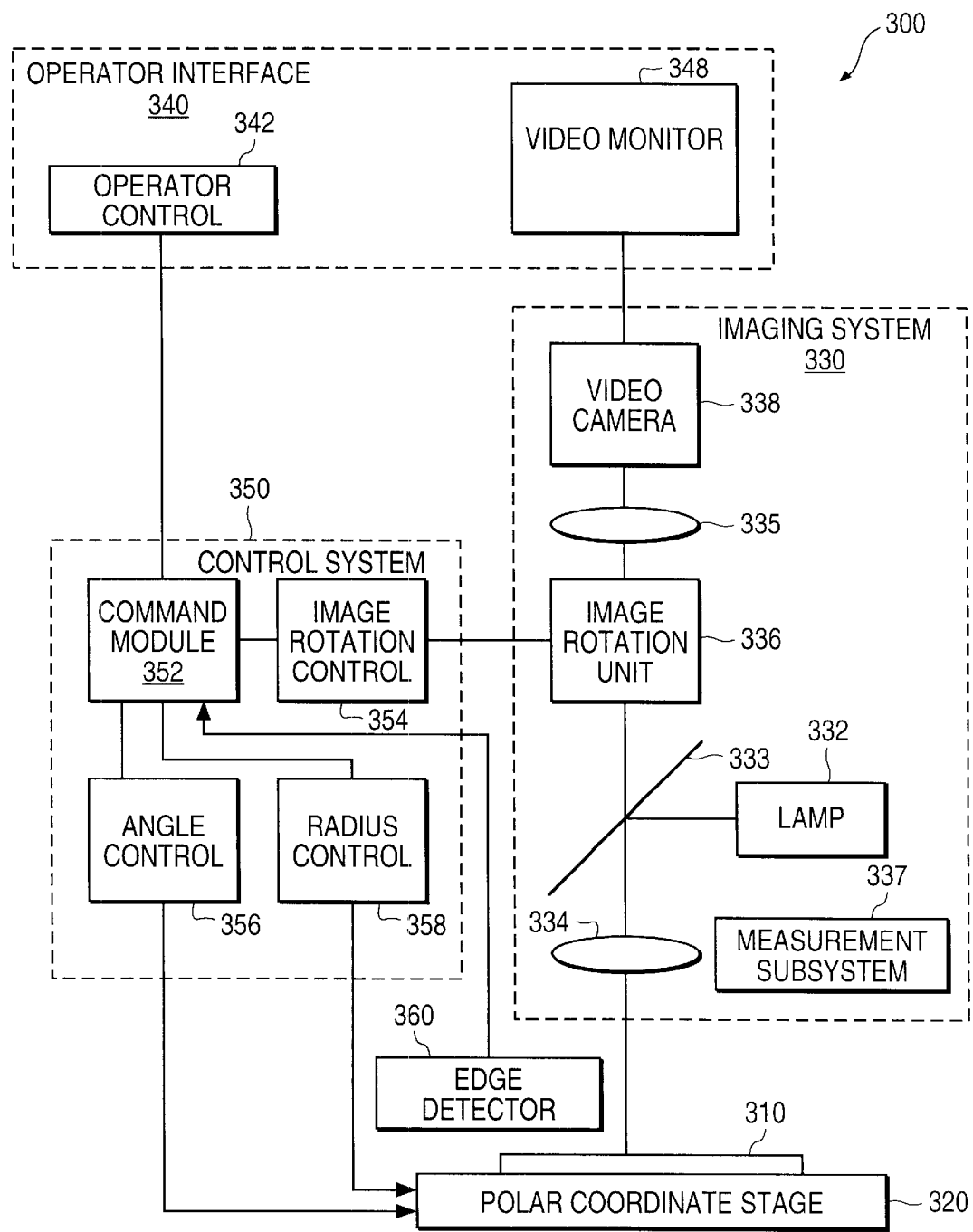
FIG. 3 is block diagram of an embodiment of the invention using an optical microscope and optical image rotation.

FIG. 3 illustrates a measurement system 300 in accordance with an embodiment of the invention. System 300 includes a polar coordinate stage 320, an imaging system 330, an operator interface 340, a control system 350, and an edge detector 360. Polar coordinate stage 320 is a standard polar coordinate stage such as commercially available from a variety of sources and includes a linear drive that moves a rotatable platform on which sample 310 is mounted. Polar coordinate stage 320 can rotate sample 310 by 360° about a rotation axis of the platform. A rotary encoder monitors the angular orientation $\theta$ of the platform relative to a linear drive direction, which is the direction along which the linear drive moves the platform as the linear drive setting $\rho$ changes. The linear drive direction is also referred to herein as the R coordinate axis. A linear encoder monitors the linear position of the platform along the R coordinate axis. The maximum linear travel of the platform along the R coordinate axis determines the radius of the largest sample which imaging system 330 can view completely, assuming that imaging system 330 is stationary.

Imaging system 330 is for viewing or inspecting regions of sample 310. In system 300, imaging system 300 is an optical microscope that includes a lamp 332, a beam splitter 333, lenses 334 and 335, and a camera 338. In operation, beam splitter 333 reflects light from lamp 332 onto an object area on sample 310, and objective lens 334 produces a magnified reflected light image of the object area. Lens 335 projects the image into camera 338, and camera 338 generates a signal representing the image that a monitor 348 displays. Lenses 334 and 335 are merely illustrative of optical elements. Additional optical elements are typically required to achieve the desired field of view and magnification of a suitable imaging system 330. In one embodiment, imaging system 330 includes a confocal microscope.

A measurement subsystem 337 can also be associated with imaging system 330 to measure particular properties, such as reflectance, at a point in or near the region of sample 310 being viewed. For example, measurement subsystem 337 may include measuring equipment that measures reflectance at one or more points in the field of view. In an optical system, measurement subsystem 337 may include for example, an interferometer, a reflectometer, an ellipsometer, an FTIR spectrometer, or any type of spectrophotometer. Subsystem 337 can measure sample 310 through other elements of imaging system 330 or operate independently to measure a point or points in or near the field of view of imaging system 330.

Imaging system 330 further includes image rotation optics 336 which provide an adjustable rotation of the image to cancel image rotation that stage 320 causes when moving sample 310. In an exemplary embodiment of the invention, image rotation optics 336 includes a motor driven dove prism. Dove prisms are well known optical elements that provide image rotation about an optic axis, in this case the optical axis of imaging system 330. Control system 350 generates a signal that rotates the dove prism at a rate that compensates for rotation of sample 310 and prevents the image formed in camera 338 from rotating.

In an alternative embodiment, imaging system 330 includes a scanning beam microscope such as an electron beam microscope or an ion beam microscope that scans a region of sample 310 and forms a video image. The video image conventionally has horizontal raster lines which correspond to the scanning direction of the scanned beam. In such an embodiment, image rotation unit 336 includes a beam deflection system that can rotate the direction of scanning. Rotating the direction of scanning direction results in a rotation of the image on monitor 348.

Operator interface 340 is for observing the image of an object area of sample 310 and controlling movement of the field of view of imaging system 330 across sample 310. Operator interface 340 includes monitor 348 and operator control 342. Monitor 348 is a conventional video monitor capable of displaying an image represented by a signal from video camera 338. In particular, monitor 348 displays the image of the object area of sample 310, and an operator uses operator control 342 to change the object area in the field of view of imaging system 330. Operator control 342 is for inputting movement commands and directing the motion of the field of view across sample 310. In an exemplary embodiment of the invention, operator control 342 is a joystick but many alternative operator controls are suitable. For example, a region of monitor 348 can display control buttons that are software operated through the actions of a touch sensitive screen, a mouse, a track ball, a touch pad, or another pointing device. In the exemplary embodiment, an operator, observing the image from camera 338 on monitor 348, moves the joystick in a direction which corresponds to the direction in which the field of view should move relative to the displayed image. The degree of joystick movement determines the speed of image motion.

Control system 350 is a computer system that receives control signals from operator interface 340 and generates control signals to stage 320 and imaging system 330. Control system 350 includes a command module 352 that interprets the signals from operator control 342 and generates signals for controlling stage 320 and imaging system 330. In particular, command module 352 includes software that control system 350 executes to monitor and control ρ and θ settings of stage 320 and control the angle through which image rotation unit 336 rotates the image. As stage 320 moves sample 310, command module 352 sends a command via image rotation control unit 354 to image rotation unit 336 which responds by rotating the image. The image rotation is in a direction opposite the rotation of sample 310 so that the orientations of features appearing in the image remain fixed on monitor 348. For example, when the operator directs movement of the image along a feature that initially appears horizontal on monitor 348, control system 350 generates and applies a control signal to image rotation unit 336 to compensate for stage 320 rotating sample 310, and the feature in the image remains horizontal as the image moves. In the exemplary embodiment, image rotation control 354 includes a hardware interface conveying information to and from image rotation unit 336.

Control system 350 also determines and applies signals to an angle control unit 356 and a radius control unit 358 so that stage 320 moves sample 310 at the desired speed in the desired direction relative to the displayed image. In the exemplary embodiment, control units 356 and 358 combined include a hardware interface conveying information to and from stage 320. Known computer controlled polar stages and their interfaces are suitable for system 300. Control system 350 further receives signals from edge detector 360 for a prealignment process described below. The prealignment process provides a precise indication of the orientation and position of sample 310.

Figure 4:
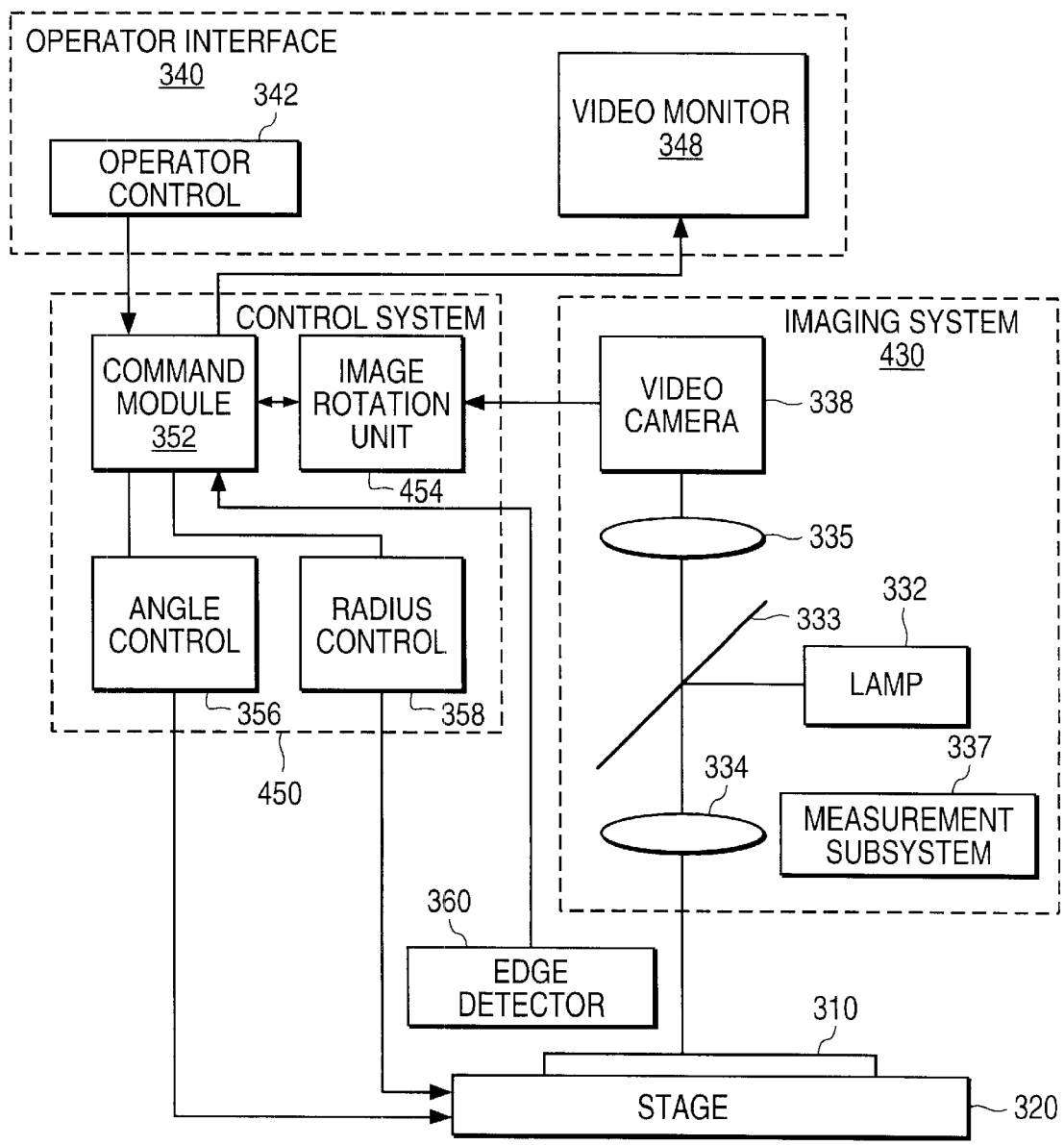
FIG. 4 is block diagram of an embodiment of the invention using software to rotate an image.

FIG. 4 is block diagram of an inspection or measurement system 400 that uses software for image rotation. System 400 includes a stage 320, an operator interface 340, an edge detector 360, and a measurement subsystem 337 which are the same as those described above in regard to system 300 of FIG. 3. System 400 also includes an imaging system 430 and a control system 450. In system 400, imaging system 430 does not include an optical or mechanical system for rotating the image. Instead, control system 450 includes an image rotation unit 454. Image rotation unit 454 includes an acquisition board that receives a video image signal from camera 338 and a module from rotating the video image. Typically, software performs the image rotation, but alternatively, hardware could be designed that electronically rotates the image. When command module 352 directs stage 320 to rotate sample 310, the image from camera 338 is of a rotating (and moving) portion of sample 310. Image rotation unit 454 processes the input video signal to compensate for the rotation and generates an output video signal representing a moving image which preserves the orientations of features on sample 310. Control system 450 then provides a video signal representing the corrected image to video monitor 348.

In one exemplary embodiment of system 400, stage 320 is a polar stage available from Kensington Laboratories and is used to mount semiconductor wafers up to 200 mm in diameter. Additionally, a z coordinate stage can be added to or integrated into stage 320 for focusing for imaging system 430 and/or measurement system 337. For example, imaging system 330 can attach to the z coordinate stage for focusing on a wafer on the polar coordinate stage. Imaging system 430 includes an optical microscope that provides a field of view at sample 310 which is about 1.3 mm×1 mm. Imaging system 430 also directs light from a small spot (about 15 microns in diameter) at the center of the field of view to a spectrometer which collects data on the reflectance. This data can be used for determining the film thickness. A co-filed provisional U.S. patent App. entitled "Compact Optical Reflectometer System", of R. Yarussi and Blaine R. Spady, Ser. No. 60/092,384, describes some suitable measuring and imaging systems and is hereby incorporated by reference in its entirety.

Control system 450 is a computer such as a 400 MHz Pentium II-based personal computer having a video capture board for connection to video camera 338 and an interface for connection to stage 320. Video capture boards capable of performing real time image rotation are commercially available from a variety of sources including, for example, Visicom, Inc. The interface board required for connecting control system 450 to stage 320 depends on the stage manufacturer. In this embodiment, operator control 342 is implemented in software as controls appearing on monitor 348.

Before an operator uses system 300 or 400 to measure or inspect sample 310, prealignment and alignment processes accurately determine the position and orientation of sample 310. Typically when a sample such as a wafer is placed onto stage 320, the position of the center of sample 310 is known only to within one or two millimeters, and the angular orientation of the sample 310 may be completely unknown.

In accordance with an aspect of the invention, a prealignment procedure uses edge detector 360 and stage 320 to determine the position and orientation of sample 310. For the prealignment procedure, a light source (not shown) below sample 310 illuminates sample 310, and sample 310 casts a shadow onto edge detector 360. Edge detector 360 includes a linear detector array located above sample 310 and precisely identifies the edge location of the shadow of sample 310 while stage 320 rotates sample 310 through 360°. If sample 310 is nearly circular but not perfectly centered on the stage, the position of the shadow on detector 360 moves slightly as stage 320 rotates sample 310.

Figure 5:
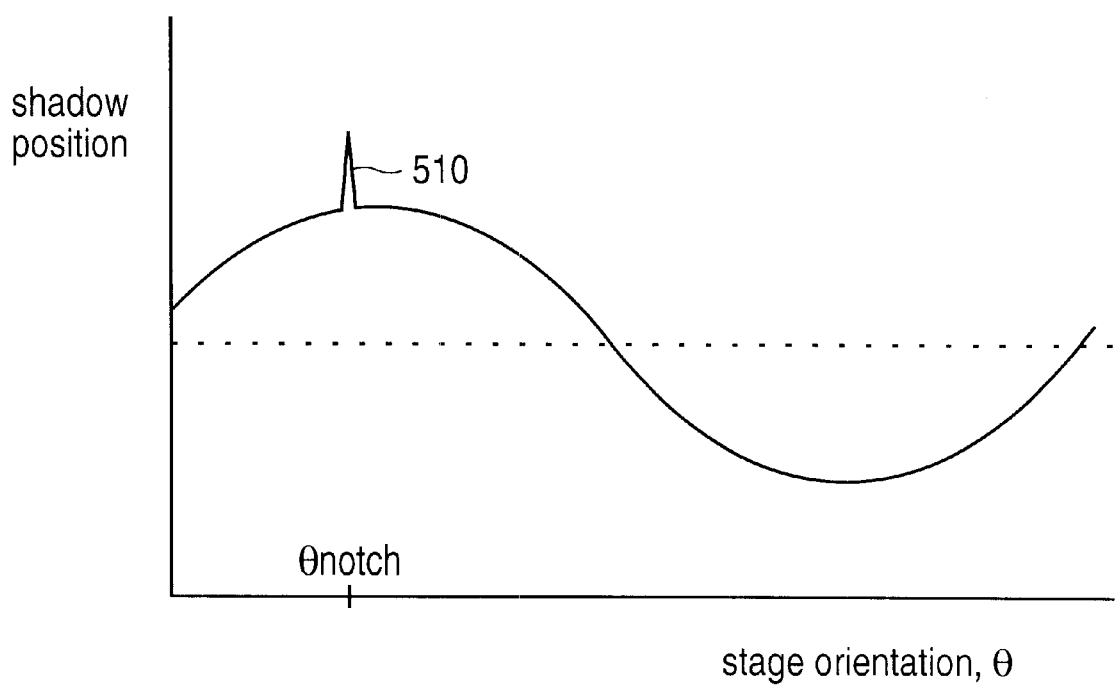
FIG. 5 is a plot of edge position measurements used in a prealignment process for the system of FIG. 3 or 4.

FIG. 5 shows a typical graph of the angular position of stage 320 versus the position of the shadow of sample 310 when sample 310 is a circular wafer having a notch in its perimeter. The position of the shadow of sample 310 generally follows a sinusoidal curve except where the notch causes a spike 510 in the sinusoid. The angular orientation of sample 310 is found from the position of spike 510. The offset of the center of sample 310 from the rotation axis of stage 320 is a vector having a direction identified from maxima/minima of the sinusoidal curve and a magnitude of half the amplitude of the sinusoidal curve. Known statistical analysis techniques can be applied to the shadow position measurements (neglecting the spike) to determine the offset. For the exemplary embodiment of system 400, the position of the wafer is then found within approximately 0.2 mm.

This is not accurate enough for many applications. The next level of alignment is a deskew procedure. This procedure can be done with a video camera that looks at a field of view on the order of 1 mm×1 mm and identifies a feature such as an alignment mark in the field of view of sample 310. Imaging systems 330 (FIG. 3) and 430 (FIG. 4) fit these requirements, and can be used for the alignment process. Since the prealignment procedure aligns sample 310 to approximately 0.2 mm, a 1 mm×1 mm field of view centered on the expected location of the desired feature will include the feature. Pattern recognition software executed in the control system can then be used to find the position of the feature to within a few microns. Repeating the alignment process with a feature in another location on sample 310 can accurately find the position and orientation of sample 310. If stage 320 is accurate enough, any point on sample 310 can be found within a few microns simply by controlling the settings of stage 320. If stage 320 is not sufficiently accurate, the pattern recognition is repeated at subsequent measurement points. Now that the wafer has been accurately located, optical measurements can be made.

Figure 6:
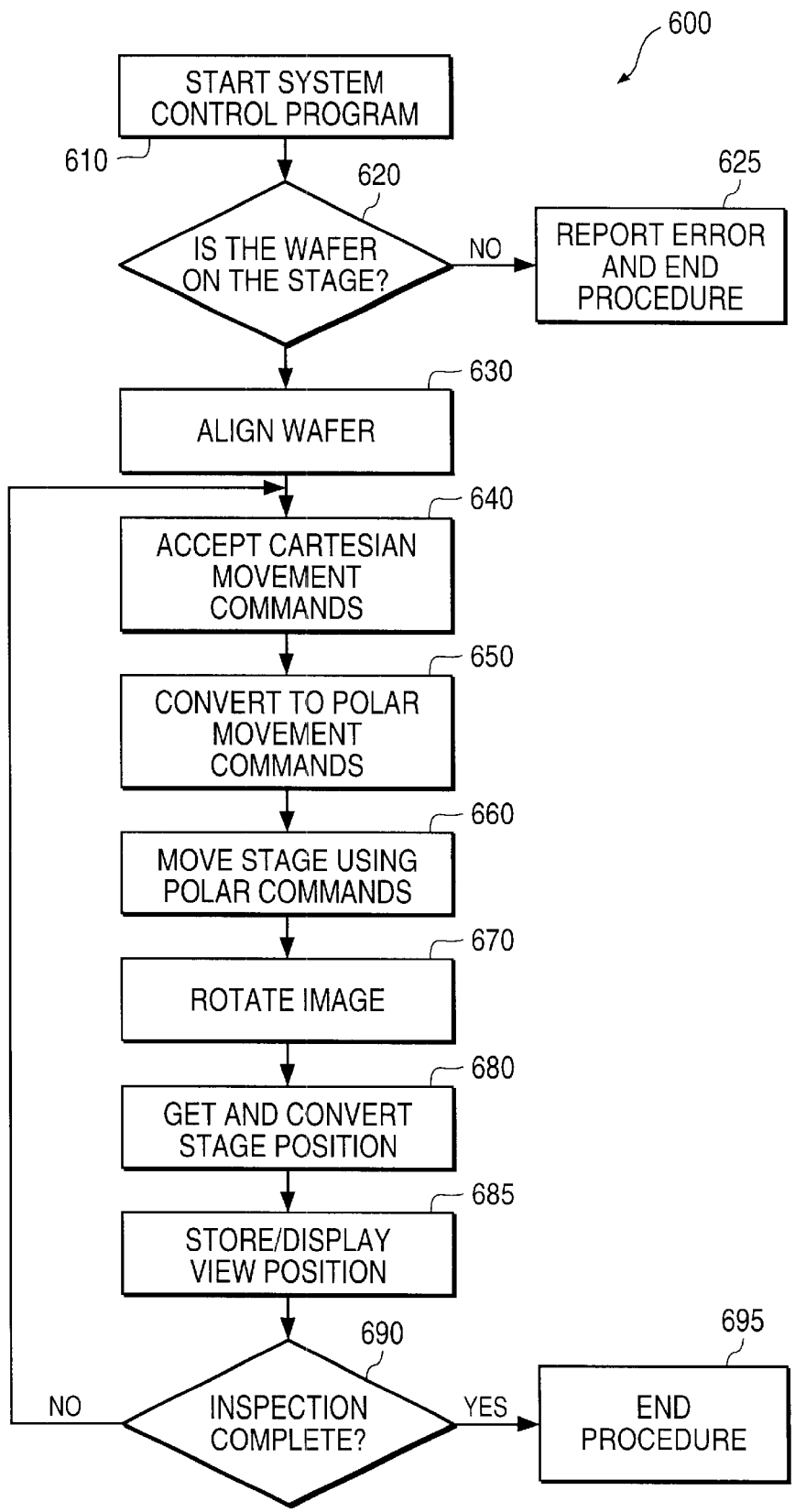
FIG. 6 is a flow diagram of a system control program for the system of FIG. 3 or 4.

FIG. 6 shows a flow diagram illustrating a process 600 for control of the polar coordinate stage 320 and image rotation unit 454 and determination of the position of sample 310 on stage 320 of FIG. 4, during measurement or inspection of sample 310. An initial block 610 initiates the system control program in control system 450. An initial inquiry 620 of process 600 determines whether sample 310 is present on stage 320. An object-present sensor or the operator responds to inquiry 620. If no sample is present, process 600 ends in step 625 by reporting an error (no sample present). If sample 310 is present, block 630 implements the prealignment/alignment process described above. In particular, stage 320 rotates sample 310, edge detector 360 measures edge positions, and control system 450 analyzes the edge position measurements to identify an offset between the rotation axis of stage 320 and the center of sample 310. If necessary, sample 310 is then more precisely aligned or located using a deskewing procedure. Prealignment/alignment step 630 can be omitted when precise alignment of sample 310 is not required, for example, when sample 310 is simply inspected visually.

Once sample 310 is present and properly aligned, process 600 moves sample 310 according to the commands from an operator. In step 640, control system 400 receives Cartesian input commands from the operator. The input commands indicate a desired movement direction and speed relative to the image on monitor 348. Step 650 converts the Cartesian input commands to polar coordinate output commands for stage 320, and block 660 applies the appropriate signals to stage 320 to move sample 310. Step 670 is simultaneous with step 660 and rotates the image to cancel the rotation of sample 310 in step 660.

Figure 7:
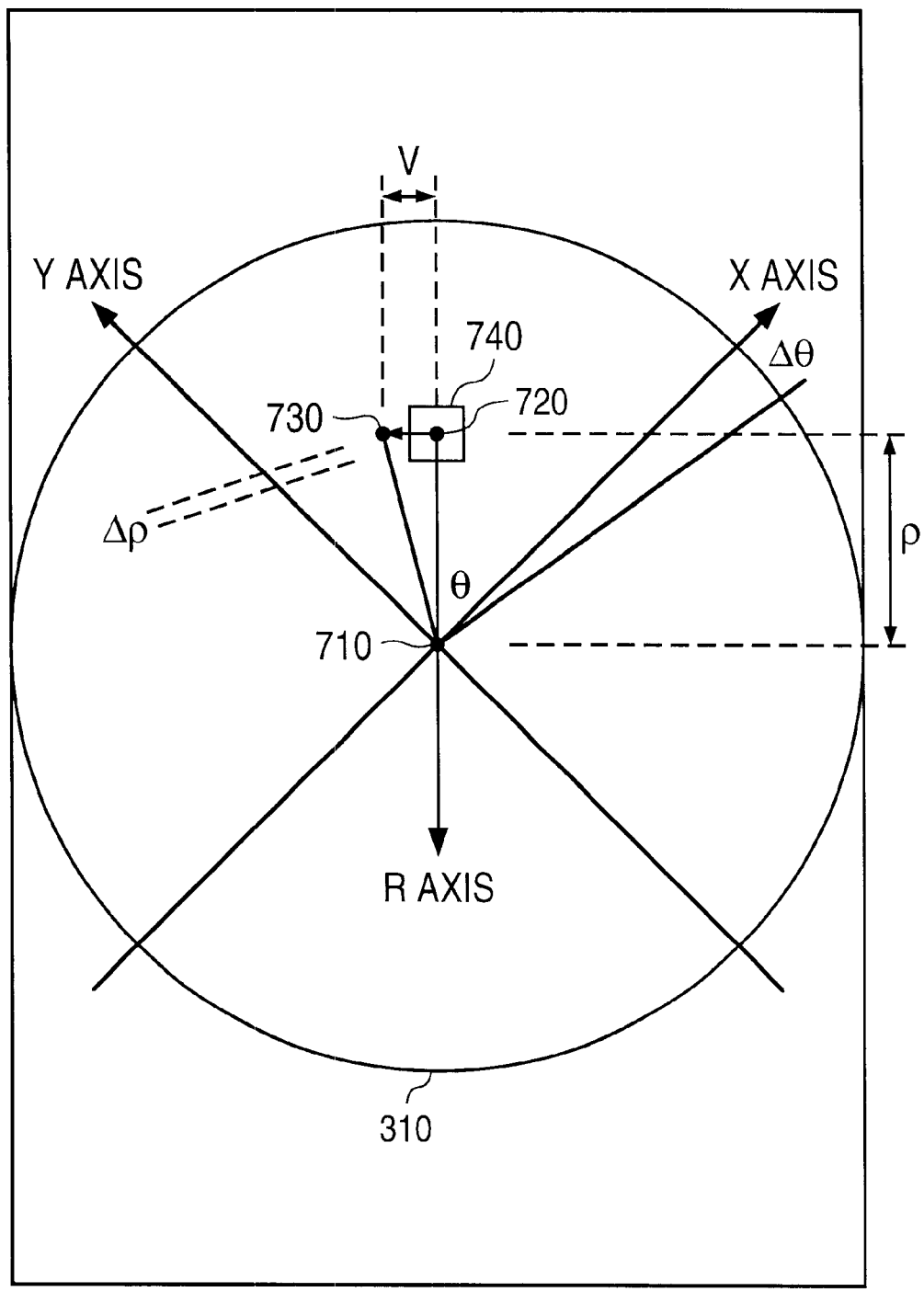
FIG. 7 illustrates the relationship between the image axes and stage axes.

To illustrate conversion and image rotation steps 660 and 670, FIG. 7 shows the relationship between the X and Y coordinate axes and the R coordinate axis of stage 320. The X and Y axes are fixed on sample 310 and centered on the rotation axis 710 of the platform on which sample 310 is mounted. As noted above, rotation axis 710 is typically offset from the center of sample 310 by an amount determined during prealignment and/or alignment. Rotation axis 710 of stage 320 passes through the R coordinate axis. The R coordinate axis corresponds to the direction of linear motion of stage 320 and has an origin that remains in the center of a field of view 740 of the imaging system. A view point 720 on sample 310, which is currently at the center of field of view 740, has polar coordinates $\rho$ and $\theta$ relative to rotation axis 710. Coordinate $\rho$ is the distance that stage 320 moved sample 310. Coordinate $\theta$ is the angle through which stage 320 rotated sample 310.

Image rotation 670 preserves the orientation of the X and Y axes as viewed on monitor 348. For example, the X axis if initially horizontal remains horizontal on monitor 348 regardless of how stage 320 rotates sample 310. Accordingly, if the X axis is initially along the R axis, step 670 rotates the image by $-\theta$, where $\theta$ is the polar coordinate of view point 720.

In general, the Cartesian input commands indicate a vector V having X and Y components Vx and Vy, and the magnitude |V| of the vector indicates the speed of movement of the view point in the image. In one embodiment of the invention, step 650 continuously converts velocity components Vx and Vy to a radial velocity Vr and an angular velocity $\omega$. Radial velocity Vr controls the velocity at which stage 320 moves sample 310 in along the R axis, and angular velocity $\omega$ determines the angular velocity of rotation of sample 310. The velocity components can be determined from vector V and the coordinates of view point 720 using equations 1.

$$Vr = Vx * \cos\theta + Vy * \sin\theta$$
$$\omega = (Vx * \sin\theta - Vy * \cos\theta)/\rho$$

Equations 1

Alternatively, when stage 320 uses coordinate settings rather than velocity settings, the input commands are sampled at a fixed frequency so that the components Vx and Vy indicate small displacements $\Delta X$ and $\Delta Y$ which are the product of the velocity components and the time between samples. Displacements $\Delta X$ and $\Delta Y$ shift a point 730 to the center of the field of view 740. In this case, step 650 converts the displacements $\Delta X$ and $\Delta Y$ to polar displacements $\Delta\theta$ and $\Delta\rho$. The polar displacements $\Delta\theta$ and $\Delta\rho$ have magnitudes that depend on displacements $\Delta X$ and $\Delta Y$ and the coordinates (X,Y) or ($\theta,\rho$) of current view point 720. Such conversions involve well known geometric techniques. It is desirable that stage 320 move sample 310 uniformly so that the displacements $\Delta X$ and $\Delta Y$ require the full time between consecutive samplings of the input commands. Accordingly, to achieve this, the stage velocities need to vary according to the magnitude |V|, and the angular velocity needs to vary with radius. However, discontinuous shifts of sample 310 are imperceptible by the operator if the sampling period is sufficiently short, for example, if the sampling and shifting rate is higher than the frame rate of monitor 348.

A step 680 gets and converts the stage position, and a step 685 can then store or display the position and the rotated image for inspection process 600. After display of the inspection point, step 690 determines whether the inspection is complete. If not, process 600 branches back to step 640 to accept further Cartesian movement commands for movement to another inspection point. If the inspection is complete, process 600 ends in step 695.

Although the invention has been described with reference to particular embodiments, the description is only an example of the invention's application and should not be taken as a limitation. In particular, even though much of the preceding was aimed at systems using imaging systems that are optical microscopes, alternative embodiments of this invention include other imaging systems such as electron-beam or ion-beam microscopes. Various other adaptations and combinations of features of the embodiments disclosed are within the scope of the invention as defined by the following claims.

We claim:

1. A device comprising:
   a polar coordinate stage that includes a linear drive and a rotatable platform mounted on the linear drive, wherein an object to be imaged is placed on the rotatable platform;
   an imaging system;
   an image rotator; and
   a control system coupled to the polar coordinate stage and the image rotator, wherein the control system controls the image rotator and causes the image rotator to rotate an image to compensate for rotation of the rotatable platform and preserve orientations of features in the image.

2. The device of claim 1, wherein the control system applies control signals to the polar coordinate stage to control movement of the object and applies control signals to the image rotator to compensate for the rotation of the object.

3. The device of claim 2, further comprising an operator interface including a monitor for viewing the image.

4. The device of claim 3, wherein the operator interface further comprises a control coupled to send to the control system commands indicating a desired motion of the image viewed on the monitor.

5. The device of claim 1, wherein the rotatable platform has a rotation axis that intersects a linear drive axis along which the stage moves rotatable platform.

6. The device of claim 5, an optic axis of the imaging system is stationary relative to the polar coordinate stage and coincides with the linear drive axis.

7. The device of claim 1, a setting of the linear drive indicates a displacement of the linear drive relative to a zero displacement position.

8. The device of claim 1, further comprising an orientation monitoring system that measures an angular displacement of the rotatable platform relative to a zero angular displacement setting.

9. The device of claim 1, further comprising a video camera and a display monitor.

10. The device of claim 9, wherein the image rotator comprises an image capture and image processing system that captures the image from the video camera and rotates the image by an amount selected by the control system.

11. The device of claim 1, wherein the imaging system comprises a microscope.

12. The device of claim 11, wherein the image rotator comprises a rotatable dove prism on an optical axis of the microscope.

13. The device of claim 11, further comprising a video camera and a display monitor.

14. The device of claim 13, wherein the image rotator comprises a rotatable Dove prism on an optical axis of the microscope.

15. The device of claim 13, the image rotator comprises software which is capable of rotating a video image from the video camera.

16. The device of claim 1, wherein the imaging system comprises a scanning probe microscope.

17. The device of claim 1, wherein the imaging system comprises a scanning microscope.

18. The device of claim 17, further comprising an image processing system and display monitor.

19. The device of claim 17, wherein the image rotator comprises a set of beam deflectors that changes orientation of an area scanned on the surface of the object.

20. The device of claim 17, wherein the scanning microscope is a scanning electron-beam microscope.

21. The device of claim 17, wherein the scanning microscope is a scanning ion-beam microscope.

22. The device of claim 1, wherein the imaging system comprises a confocal microscope.

23. The device of claim 22, further comprising an image processing system and a display monitor.

24. The device of claim 1, wherein the image rotator comprises a rotatable dove prism.

25. The device of claim 1, wherein the image rotator comprises software which allows rotation of a digitized image.

26. The device of claim 1, wherein the control system comprises a processor executing a module that converts Cartesian coordinate input commands relative to an image of the object to polar coordinate stage commands and image rotator commands.

27. A method for viewing an object, comprising:
    mounting the object on a polar coordinate stage;
    viewing an image of a region of the object;
    using the polar coordinate stage to move the object; and
    rotating the image of the object as the object moves so that features in the image retain a fixed orientation while the object rotates.

28. A measuring device comprising:
    a polar coordinate stage including a rotatable platform for mounting of a sample;
    an alignment system including an edge detector and a processing system that identifies a position of the sample from measurements that the edge detector takes while the polar coordinate stage rotates the sample;
    a measurement system for measuring a physical property of a portion of the sample that the polar coordinate stage moved into a field of view of the measurement system;
    an imaging system for obtaining an image of a portion of the sample that the polar coordinate stage moved into a field of view of the imaging system; and
    an image rotator that rotates the image to compensate for rotation of the sample by the polar coordinate stage.

29. The measuring device of claim 28, wherein the alignment system further comprises a pattern recognition module that identifies a feature in the image as rotated by the image rotator and from identification of the feature, determines a position of the sample.

30. The measuring device of claim 28, wherein the imaging system includes a video camera and the image rotator rotates a video image from the video camera.

31. The measuring device of claim 28, wherein the image rotator comprises an optical element for rotating the image.

32. The measuring device of claim 28, wherein the alignment system further comprises a pattern recognition module that identifies a feature in the image and determines a position of the sample.

33. A measuring method comprising:

mounting a sample on a polar coordinate stage, wherein the sample as mounted has a position known to a first accuracy;

measuring edge locations of the sample while the polar coordinate stage rotates the sample;

prealigning the sample by determining the position of the sample from the edge locations, wherein the prealigning determines the position of the sample to a second accuracy;

using the polar coordinate stage to move the sample so that a view area of an imaging system contains a first feature;

rotating an image formed by the imaging system to compensate for rotation of the sample by the polar coordinate stage;

using a pattern recognition module to process the rotated image and identify a first location corresponding to the first feature; and measuring a property of the sample at a point having a position identified relative to the first location.

34. The method of claim 33, further comprising:

using the polar coordinate stage to move the sample so that the view area of the imaging system contains a second feature;

rotating the image formed by the imaging system to compensate for a rotation of the sample by the polar coordinate stage while moving to the second feature;

using the pattern recognition module on the rotated image to identify a second location corresponding to the second feature; and using identification of the first and second locations to determine the position of the sample to a third accuracy.

35. The method of claim 33, further comprising:

using the polar coordinate stage to move the sample so that a plurality of points are sequentially positioned for measurement of the property of the sample at the points; and sequentially measuring the property of the sample at the measurement points.

\* \* \* \* \*

(12) EX PARTE REEXAMINATION CERTIFICATE (5106th)
United States Patent
Buchanan et al.

(10) Number: US 6,320,609 C1
(45) Certificate Issued: May 3, 2005

(54) SYSTEM USING A POLAR COORDINATE STAGE AND CONTINUOUS IMAGE ROTATION TO COMPENSATE FOR STAGE ROTATION

(75) Inventors: Robert Buchanan, Pleasanton, CA (US); Richard A. Yarussi, Mountain View, CA (US); Blaine R. Spady, San Jose, CA (US)

(73) Assignee: Nanometrics Incorporated, Sunnyvale, CA (US)

Reexamination Request:
No. 90/006,879, Dec. 2, 2003

Reexamination Certificate for:
Patent No.: 6,320,609
Issued: Nov. 20, 2001
Appl. No.: 09/113,484
Filed: Jul. 10, 1998

(51) Int. Cl.$^7$ ............................................. H04N 7/18
(52) U.S. Cl. ........................................ 348/126; 348/135
(58) Field of Search ............................ 348/126, 135, 348/125, 127–131, 142; 250/360.1, 372, 492.22, 559.08, 559.18, 559.41, 559.46; 341/13; 359/391, 393; 716/21; H04N 7/18

(56) References Cited

U.S. PATENT DOCUMENTS

| | | |
|---|---|---|
| 4,107,527 A | 8/1978 | Cherepin et al. |
| 4,202,037 A | 5/1980 | Glaser et al. |
| 4,593,406 A | 6/1986 | Stone |
| 4,744,642 A | 5/1988 | Yoshinaga et al. |
| 4,832,474 A | 5/1989 | Yoshinaga et al. |
| 5,127,726 A | 7/1992 | Moran |
| 5,159,412 A | 10/1992 | Willenborg et al. |
| 5,210,410 A | 5/1993 | Barrett |
| 5,517,312 A | 5/1996 | Finarov |
| 5,532,874 A | 7/1996 | Stein |
| 5,597,590 A | 1/1997 | Tanimoto et al. |
| 5,981,937 A | 11/1999 | Denaro |
| 6,320,609 B1 | 11/2001 | Buchanan et al. |

FOREIGN PATENT DOCUMENTS

| | | |
|---|---|---|
| WO | WO 92/04620 | 3/1992 |
| WO | WO 96/27786 | 9/1996 |
| WO | Wo 97/17639 | 5/1997 |

OTHER PUBLICATIONS

R. C. Gonzalez and R. E. Woods, Digital Image Processing (1992).
Media Cybermetics, Image–Pro Plus™ (1993).
Matrox Imaging Products Group, Matrox ITOOLS (Jan. 1993).
Matrox Imaging Products Group, Matrox Genesis, PCT Image Processor, "Technical Brief" (Oct. 1, 1996).
Matrox Imaging Products Group, Matrox Genesis (Oct. 1, 1996).
Matrox Imaging Products Group, Matrox Imaging Library (MIL) (Feb. 23, 1996).
Matrox Imaging Products Group, Matrox Imaging Library Version 4.0 (Nov. 1, 1996).
PROMETRIX, FT–700™ and FT–750™, Film Thickness Probe with StatTrax® version 6.0, "User's Guide" (Jul. 1993).

*Primary Examiner*—Gims Philippe

(57) ABSTRACT

A method for controlling a polar coordinate stage moves an object relative to an imaging system. While moving the object, the image of the object is rotated to compensate for rotation of the object. Accordingly, the orientations of features in the image are preserved, and removal of apparent rotation in the image reduces confusion an operator experiences while directing movement of the object. The angular velocity of the motion of the object is controlled so that image shift speed is independent of the radial position of the point being viewed. Use of a polar stage, reduces the required foot print for a stage and facilitates prealignment. In particular, an edge detector measures the position of the edge of the object while the polar coordinate stage rotates the object. A prealignment process determines the position and orientation of the object from the measured edge positions. A further alignment process uses automated pattern recognition which more easily identifies features on the object when the image is rotated so that the orientations of the feature are approximately known.

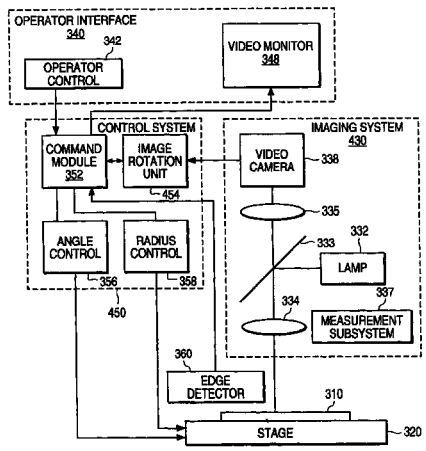

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–35 is confirmed.

* * * * *

US006320609C2

(12) EX PARTE REEXAMINATION CERTIFICATE (6305th)

United States Patent
Buchanan et al.

(10) Number: US 6,320,609 C2
(45) Certificate Issued: Jul. 15, 2008

(54) SYSTEM USING A POLAR COORDINATE STAGE AND CONTINUOUS IMAGE ROTATION TO COMPENSATE FOR STAGE ROTATION

(75) Inventors: Robert Buchanan, Pleasanton, CA (US); Richard A. Yarussi, Mountian View, CA (US); Blaine R. Spady, San Jose, CA (US)

(73) Assignee: Nanometrics Incorporated, Sunnyvale, CA (US)

Reexamination Request:
No. 90/007,630, Jul. 14, 2005

Reexamination Certificate for:
Patent No.: 6,320,609
Issued: Nov. 20, 2001
Appl. No.: 09/113,484
Filed: Jul. 10, 1998

Reexamination Certificate C1 6,320,609 issued May 3, 2005

(51) Int. Cl.
*H04N 7/18* (2006.01)

(52) U.S. Cl. .......................................... 348/126; 348/135
(58) Field of Classification Search .................. 348/126, 348/135
See application file for complete search history.

(56) References Cited

U.S. PATENT DOCUMENTS

| | | | |
|---|---|---|---|
| 4,107,527 A | 8/1978 | Cherepin et al. | 250/309 |
| 4,202,037 A | 5/1980 | Glaser et al. | 364/518 |
| 4,832,474 A | 5/1989 | Yoshinagawa et al. | 350/529 |
| 5,127,726 A | 7/1992 | Moran | 356/237 |
| 5,159,412 A | 10/1992 | Willenborg et al. | 356/445 |
| 5,210,410 A | 5/1993 | Barrett | 250/234 |
| 5,517,312 A | 5/1996 | Finarov | 356/386 |
| 5,532,874 A | 7/1996 | Stein | 359/394 |
| 5,597,590 A | 1/1997 | Tanimoto et al. | 425/174.4 |
| 5,656,229 A * | 8/1997 | Tanimoto et al. | 264/400 |
| 5,981,937 A | 11/1999 | Denaro | 250/234 |
| 6,038,029 A | 3/2000 | Finarov | 356/385 |

FOREIGN PATENT DOCUMENTS

WO  WO 92/04620  3/1992

OTHER PUBLICATIONS

Prometrix, FT–700™ and FT–750™, Film Thickness Probe with StatTrax® version 6.0, "User's Guide" (Jul. 1993).
Media Cybernetics, Image–Pro Plus™ (1993).
R. C. Gonzalez and R. E. Woods, Digital Image Processing (1992).

* cited by examiner

*Primary Examiner*—Charles Craver

(57) ABSTRACT

A method for controlling a polar coordinate stage moves an object relative to an imaging system. While moving the object, the image of the object is rotated to compensate for rotation of the object. Accordingly, the orientations of features in the image are preserved, and removal of apparent rotation in the image reduces confusion an operator experiences while directing movement of the object. The angular velocity of the motion of the object is controlled so that image shift speed is independent of the radial position of the point being viewed. Use of a polar stage, reduces the required foot print for a stage and facilitates prealignment. In particular, an edge detector measures the position of the edge of the object while the polar coordinate stage rotates the object. A prealignment process determines the position and orientation of the object from the measured edge positions. A further alignment process uses automated pattern recognition which more easily identifies features on the object when the image is rotated so that the orientations of the feature are approximately known.

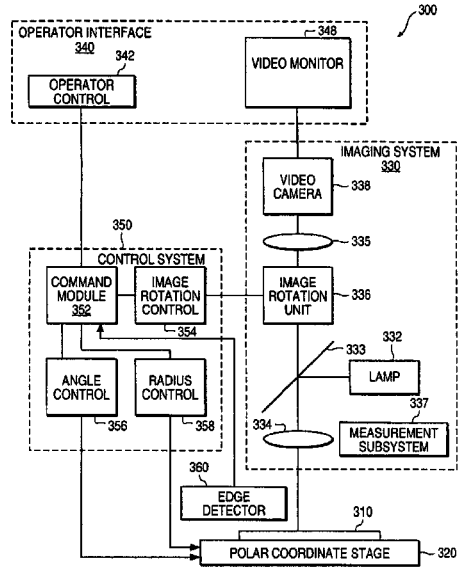

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–26 and 28–35 is confirmed.
Claim 27 is cancelled.

\* \* \* \* \*